Aug. 16, 1960

W. K. BROWN 2,949,539

OPTICAL ENCODER

Filed Nov. 21, 1956

Inventor
Wilfred K. Brown
By: Graf, Nieman & Burmeister
Attorney

United States Patent Office 2,949,539

Patented Aug. 16, 1960

2,949,539

OPTICAL ENCODER

Wilfred K. Brown, Cincinnati, Ohio, assignor to The Baldwin Piano Company, Cincinnati, Ohio, a corporation of Ohio

Filed Nov. 21, 1956, Ser. No. 623,662

10 Claims. (Cl. 250—219)

The present invention relates generally to analogue to digital encoders and to photocells for use in optical encoders.

Optical encoders are commonly used to transform analogue information to digital form. Generally, optical encoders employ a code disc mounted to a rotatable shaft, and the analogue information is impressed upon the rotatable shaft. The code disc is provided with one or more annular tracks of opaque and transparent sectors coaxially disposed about the center of the code disc. A lamp is disposed adjacent to one side of the code disc, and an assembly of photocells confronts the opposite side of the disc. A radial-defining slit is disposed between the code disc and the photocell assembly to restrict light passing through the transparent portions of the code disc to a narrow pattern upon the photocells. By rotationally positioning the code disc responsive to the analogue data and pulsing the lamp with a read-out pulse, a digital output may be obtained from the photocells. More recently, the read-out pulse has been used to actuate the photocells, and the lamp continuously operated.

The purpose of the slit between the photocell assembly and the code disc is to define a radial region through which the photocells receive light from less than one quantum space of the code disc. For present purposes, a quantum space may be considered to be one-half the shortest opaque or transparent sector of a track of the code disc. In previously employed optical encoders, the slit requires considerable space between the code disc and the photocell assembly making it necessary to position the photocells more remotely from the code disc than would otherwise be possible. As a result of the relatively remote positioning of the photocells relative to the code disc, the dark to light response ratio of the photocells is reduced. It is one of the objects of the present invention to provide an optical encoder employing a code disc, a plurality of photocells, and a radial-defining slit between the photocells and the code disc in which the photocells may be positioned much closer to the code disc than has heretofore been possible.

The light to dark ratio of an optical encoder is also improved by reducing the distance between the radial-defining slit and the photocells. It is therefore an object of the present invention to provide an optical encoder in which the distance between the radial-defining slit and the photocells approaches a minimum. It has also been difficult to accurately align the radial-defining slit and the photocells of an optical encoder with a radius of the code disc. It is therefore a further object of the present invention to provide an optical encoder in which the radial-defining slit and photocells may be more readily aligned with a radius of the code disc.

These and further objects of the present invention will become readily apparent upon a further reading of the present disclosure, particularly when viewed in light of the drawings, in which.

Figures 1, 3:
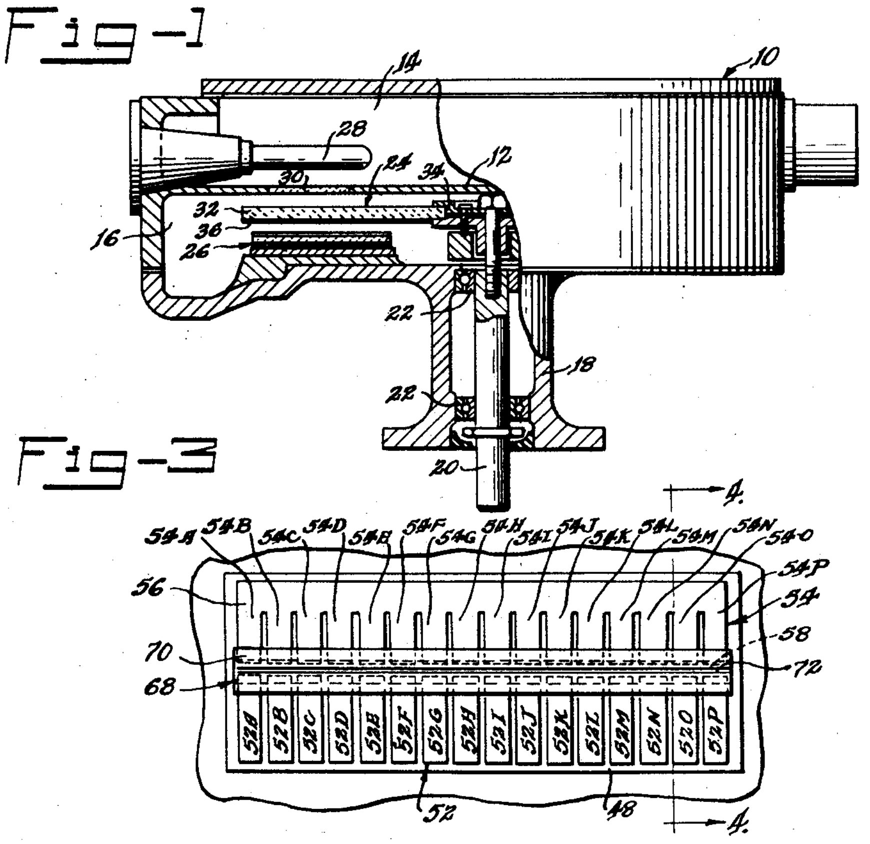
Figure 1 is a view of an encoder constructed according to the teachings of the present invention partly in section and partly in elevation.
Figure 3 is a plan view of the photocell and slit assembly shown in Figure 1.

Referring to Figure 1, the optical encoder employs a housing 10 which is cylindrical in shape and has a partition 12 extending therethrough dividing the housing into two compartments 14 and 16. An axial hub 18 extends outwardly from the compartment 16, and a shaft 20 protrudes from the hub 18. The shaft 20 is journaled in bearings 22 mounted within the hub 18, and a code disc 24 is secured to the shaft 20 and rotatable therewith within the compartment 16. A photocell and slit assembly 26 is mounted closely adjacent to the code disc 24 on the side thereof opposite to the partition 12. A lamp 28 is mounted in the compartment 14 aligned with a window 30 in the partition 12 and the photocell assembly 26. The housing 10 is a dust tight unit.

Figure 2:
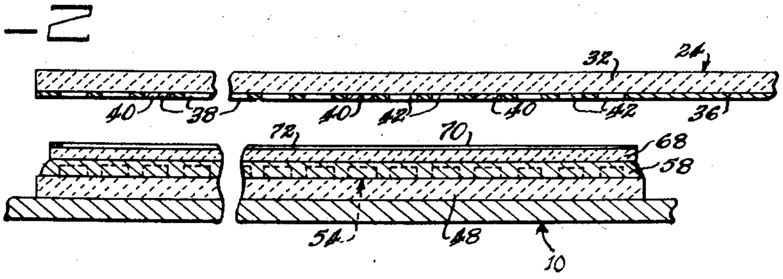
Figure 2 is a sectional view of the code disc of the encoder illustrated in Figure 1.

The code disc 24 is constructed with a transparent base 32 which is provided with an axial aperture 34. The code disc 24 is secured at its aperture 34 to one end of the shaft 20. The base 32 may be constructed of any transparent material of suitable mechanical properties, and glass has been found to be particularly suitable. The surface of the code disc confronting the photocell and slit assembly 26 has a coating 36 of opaque material, and sixteen annular tracks 38 formed of opaque sectors 40 and transparent sectors 42 are disposed in the coating 36 coaxially about the shaft 20, as illustrated in Figure 2.

Figure 4:
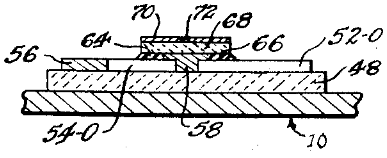
Figure 4 is a sectional view of the photocell assembly taken along the line 4—4 of Figure 3.

Figures 3 and 4 illustrate the photocell and slit assembly 26. A plate 48 of electrical insulating material, in the particular construction glass, is directly secured to the housing 10. A first group 52 of electrodes 52A, 52B, 52C, 52D, 52E, 52F, 52G, 52H, 52I, 52J, 52K, 52L, 52M, 52N, 52O and 52P, confront a second group 54 of electrodes 54A, 54B, 54C, 54D, 54E, 54F, 54G, 54H, 54I, 54J, 54K, 54L, 54M, 54N, 54O and 54P, this second group 54 of electrodes being interconnected at their ends remote from the first group of electrodes by a strip portion 56. The confronting surfaces of the electrodes in the two groups 52 and 54 are disposed on opposite sides and equally spaced from a common axis, and the common axis intersects the axis of rotation of the code disc 24.

A mass of photoconductive material in the form of a layer 58 is disposed on the surface of the plate 48 between each pair of confronting electrodes, and it extends in the form of a ribbon across the two groups 52 and 54 of electrodes filling the region between the confronting ends of the two groups of electrodes and confronting the code disc 24. The most suitable materials for the photoconductive ribbon 58 have been found to be of the photoconductive semi-conductor class. Cadmium selenide has been found to produce the fastest light response thus far, and cadmium sulfide, lead sulfide (PbS), and lead selenide (PbSe) have also been found to be particularly suitable. Other suitable photoconductive materials for the layer 58 are ZnSe, ZnS, ZnTe, CdTe, germanium, silicon, and PbTe. The sensitive regions of the photocells in the assembly 26 are the regions between the confronting pairs of electrodes, such as the region between electrodes 52A and 54A. These regions are disposed on an axis intersecting the rotational axis of the code disc 24, and each of the sensitive areas confronts one of the tracks of the code disc 24; for example, the outermost track of the code disc 24 is confronted by the region between the electrodes 52A and 54A, and the innermost track of the code disc is confronted by the region between the electrodes 52P and 54P. The photocells produce a response when light impinges upon the sensitive region thereof, and this will occur when a transparent sector of the track of the code disc 24 is disposed between the sensitive region of a given photocell and the light source 28.

The photoconductive layer, or ribbon 58, extends between adjacent electrodes of each group. This, however, does not create coupling between the adjacent electrodes of each group because of the fact that the regions between the adjacent electrodes are maintained dark by the opaque coating 36 on the code disc 24 between adjacent tracks 38. As a result, the electrical resistance of the layer 58 of photoconductive material remains high in these dark regions.

Two strips 64 and 66 of cement are disposed on the base plate 48 and electrodes 52 and 54, respectively, adjacent to the ribbon 58 of photoconductive material. A thin strip 68 of transparent material is secured to the electrodes and the base plate 48 by the strips 64 and 66 of cement. A suitable material for the strip 68 has been found to be thin glass. The surface of the strip 68 remote from the electrodes 52 and 54 is provided with a coating 70 of opaque material, and a thin slit 72 is disposed in the coating 70 confronting the sensitive areas of the photocells, i.e., the region between the confronting electrodes 52 and 54. The cross section of the slit 72 must be less than the length of the shortest sector in the tracks confronting the photocell and slit assembly 26, and for high accuracy, less than one-half this distance, or in other words, less than the quantum length of the code disc 24.

In order to obtain a high light to dark ratio from the photocells, that is, a large electrical response to illumination relative to the dark condition, it is necessary to position the photocells as close to the code disc 24 as possible. This is due to the fact that the light intensity falls off inversely as the square of the distance from the source, and also due to the fact that diffusion and reflection of light have the effect of partially illuminating the dark sectors. Further, the response time of the photocells is a function of the distance from the code disc, since a photocell responds more rapidly to intense illumination than to lesser illumination. For these reasons, it is apparent that the space required to position the radial-defining slit must be held to a minimum. This the inventor has achieved by the construction described herein. Further, since the slit is positioned closely adjacent to the sensitive area of the photocells, illumination of dark sectors by reflected and diffused light is minimized.

It is also to be noted that the strip 68 protects the sensitive areas of the photocells and forms a hermetical seal thereabout. Also, electrical contact may be made directly to the electrodes, since they extend outwardly from the strip 68.

In one construction of an encoder according to the present invention, the code disc 24 employs a glass base 32 8½ inches in diameter provided with sixteen tracks 38 with widths of 0.060 inch, the tracks 38 being spaced by a distance of 0.040 inch. The outer track of the disc 24 has a diameter of 8 inches and the inner track a diameter of 4.8 inches. The number of angles, or quanta, resolved is 65,536, each quantum representing approximately 20 seconds of arc. There are 16,384 opaque and 16,384 clear lines in the outer track. Each opaque and clear line is equal in width and each is 19.5 microns wide in the outer track. The radial pattern boundaries are accurate to one-half of the quantum angle in order to maintain accuracy. A photographic process is employed to place the opaque coating 36 in the form of a photographic emulsion on the glass plate or base 32.

The distance between the slit 72 and code disc 24 is approximately 0.003 inch. The two groups of electrodes 52 and 54 are maintained at a spacing of 25 microns. The glass strip 68 has a thickness of .003 inch, thus spacing the radial-defining slit 72 from the photocells by this distance. The plate 48 has a thickness of 0.05 inch.

The photocells may be constructed with a printing technique. Electrodes 52 and 54 are printed upon the glass plate 48 in the form of an Inconel film. The photoconductive ribbon 58 is then deposited by vacuum evaporation onto the plate 48 and Inconel electrodes 52 and 54. Inconel is an alloy of nickel, chromium and iron, containing 11 to 17% chromium, at least 70% nickel, approximately 1% manganese, and a maximum of 10% iron.

The photocells may also be constructed by evaporating a rhodium or aluminum coating on the glass plate 48 and thereafter etching the electrodes 52 and 54 on the rhodium or aluminum. The photoconductive ribbon 58 is then evaporated onto the glass plate and electrodes. In this particular construction, the coating 70 on the strip 68 is also Inconel although other opaque materials may also be employed, such as aluminum, and the slit 72 has a width of 4 microns.

From the foregoing disclosure, the man skilled in the art will readily devise many other embodiments of the present invention within the scope thereof. For example, the present invention may clearly be practiced with means, other than the disc 24, for modulating the light which falls upon the photocell assembly from the light source. Hence, a plate having tracks with opaque and transparent segments other than coaxial, such as rectilinear, for the modulating means is clearly contemplated as within the scope of the invention. It is therefore intended that the scope of the present invention be not limited by the foregoing disclosure, but rather only by the appended claims.

The invention claimed is:

1. An optical encoder comprising, in combination: a photocell assembly having a plurality of pairs of electrodes having spaced confronting portions disposed on a common plane adjacent to each other, the electrodes of each pair being disposed on opposite sides of a common axis, a mass of photoconductive material disposed in contact with each pair of electrodes, a transparent strip mounted to the electrodes having one surface disposed adjacent to the electrodes, and a coating of opaque material disposed on a second surface of the transparent strip parallel to the first surface having a slit disposed in the opaque coating aligned with the common axis between the electrodes of the photocells; a light source confronting the slit; and a rotatable disc having a plurality of coaxial tracks disposed thereabout, one track being aligned between each pair of electrodes and the light source, and each track having a plurality of opaque and transparent sectors of greater length than the width of the slit.

2. An optical encoder comprising, in combination: a photocell assembly having a base plate constructed of electrically insulating material, a plurality of pairs of electrodes having spaced confronting portions disposed adjacent to each other on one surface of the base plate, the electrodes of each pair being disposed on opposite sides of a common axis, a ribbon of photoconductive material disposed in contact with the electrodes along the common axis between the electrodes, a transparent strip secured to the base plate and electrodes, and a coating of opaque material disposed on the surface of the transparent strip remote from the electrodes having a slit disposed therein aligned with the common axis between the electrodes of the photocells; a light source confronting the slit; and a rotatable disc having a plurality of coaxial tracks dipsosed thereabout, one track being aligned between each pair of electrodes and the light source, and each track having a plurality of opaque and transparent sectors of greater length than the width of the slit.

3. An optical encoder comprising, in combination: a photocell assembly having a base plate constructed of electrically insulating material, a plurality of pairs of electrodes having spaced confronting portions disposed adjacent to each other on one surface of the base plate, the electrodes of each pair being disposed on opposite sides of a common axis, a ribbon of photoconductive material disposed in contact with the electrodes along the common axis between the electrodes, a pair of strips of cement disposed on the electrodes and base plate on opposite sides of the ribbon, a transparent strip abutting the strips of cement, and a coating of opaque material disposed on the surface of the transparent strip remote from the electrodes having a slit disposed therein aligned with the common axis between the electrodes of the photocells; a light source confronting the slit; and a rotatable disc having a plurality of coaxial tracks disposed thereabout, one track being aligned between each pair of electrodes and the light source, and each track having a plurality of opaque and transparent sectors of greater length than the width of the slit.

4. A photocell assembly comprising a plurality of pairs of electrodes having spaced confronting portions disposed on a common plane adjacent to each other, the electrodes of each pair being disposed on opposite sides of a common axis, a mass of photoconductive material disposed in contact with each pair of confronting electrodes, a transparent strip having one surface adjacent to the electrodes, a coating of opaque material disposed on a second surface of the transparent strip parallel to the first surface having a slit disposed therein parallel to the common axis between the electrodes of the photocells and confronting the common axis.

5. A photocell comprising a base plate constructed of electrically insulating material, a plurality of pairs of electrodes having spaced confronting portions disposed adjacent to each other on one surface of the base plate, the electrodes of each pair being disposed on opposite sides of the common axis, a ribbon of photoconductive material disposed in contact with the electrodes along the common axis between the electrodes, a transparent strip secured to the base plate and electrodes, and a coating of opaque material disposed on the surface of the transparent strip remote from the electrodes having a slit disposed in the opaque coating aligned with the common axis between the electrodes of the photocells and parallel thereto.

6. A photocell assembly comprising a glass plate, a plurality of pairs of Inconel electrodes having spaced confronting portions disposed adjacent to each other on one surface of the glass plate, the electrodes of each pair being disposed on opposite sides of a common axis, a ribbon of cadmium selenide disposed in contact with the electrodes along the common axis between the electrodes, a glass strip secured to the glass plate and electrodes, an Inconel coating disposed on the surface of the glass strip remote from the electrodes having a slit disposed therein parallel to and aligned with the common axis between the electrodes of the photocells.

7. A photocell assembly comprising a glass plate, a plurality of pairs of Inconel electrodes having spaced confronting portions disposed adjacent to each other on one surface of the glass plate, the electrodes of each pair being disposed on opposite sides of a common axis, a ribbon of cadmium sulfide disposed in contact with the electrodes along the common axis between the electrodes, a glass strip secured to the glass plate and electrodes, and an Inconel coating disposed on the surface of the glass strip remote from the electrodes having a slit disposed therein parallel to and aligned with the common axis between the electrodes of the photocells.

8. A photocell assembly comprising a glass plate, a plurality of pairs of Inconel electrodes having spaced confronting portions disposed adjacent to each other on one surface of the glass plate, the electrodes of each pair being disposed on opposite sides of the common axis, a ribbon of lead sulfide disposed in contact with the electrodes along the common axis between the electrodes, a glass strip secured to the glass plate and electrodes, an Inconel coating disposed on the surface of the glass strip remote from the electrodes having a slit disposed therein parallel to and aligned with the common axis between the electrodes of the photocells.

9. An optical encoder comprising, in combination: a photocell assembly having a plurality of pairs of electrodes having spaced confronting portions disposed on a common plane adjacent to each other, the electrodes of each pair being disposed on opposite sides of a common axis, a mass of photoconductive material disposed in contact with each pair of electrodes, a transparent strip mounted to the electrodes having one surface disposed adjacent to the electrodes, and a coating of opaque material disposed on a second surface of the transparent strip parallel to the first surface having a slit disposed in the opaque coating aligned with the common axis between the electrodes of the photocells; a light source confronting the slit; and means disposed between the light source and the photocell assembly to modulate the light impinging upon the photocell assembly, said means having a translatable track with transparent and opaque segments confronting each pair of electrodes of the photocell assembly.

10. A photocell assembly comprising a plurality of pairs of electrodes having spaced confronting portions disposed on a common plane adjacent to each other, the electrodes of each pair being disposed on opposite sides of a common axis, a mass of photoconductive material disposed in contact with each pair of confronting electrodes, and means mounted on the electrodes for defining a narrow slit parallel to and confronting the common axis between the electrodes.

References Cited in the file of this patent

UNITED STATES PATENTS

| | | |
|---|---|---|
| 874,868 | Rothschild | Dec. 24, 1907 |
| 1,802,803 | Best | Apr. 28, 1931 |
| 1,886,188 | Hough | Nov. 1, 1932 |
| 1,998,461 | Kucher | Apr. 23, 1935 |
| 2,169,842 | Kannenberg | Aug. 15, 1939 |
| 2,402,662 | Ohl | June 25, 1946 |
| 2,582,850 | Rose | Jan. 5, 1952 |
| 2,688,564 | Forgue | Sept. 7, 1954 |
| 2,728,835 | Mueller | Dec. 27, 1955 |
| 2,745,021 | Kurshan | May 8, 1956 |
| 2,779,811 | Picciano et al. | Jan. 29, 1957 |
| 2,789,193 | Anderson | Apr. 16, 1957 |
| 2,796,534 | Williams | June 18, 1957 |
| 2,831,634 | Luhn | Apr. 22, 1958 |

FOREIGN PATENTS

| | | |
|---|---|---|
| 17,131 | Great Britain | July 20, 1914 |
| 1,065,332 | France | Jan. 6, 1954 |